Patented Jan. 17, 1950

2,495,135

UNITED STATES PATENT OFFICE 2,495,135

METHOD OF DISSOLVING LOW VISCOSITY DIOLEFIN POLYMERS

Sayre Rodman, Oakmont, Pa., assignor to The Firestone Tire & Rubber Company, Akron, Ohio, a corporation of Ohio No Drawing. Application December 11, 1946, Serial No. 715,613

3 Claims. (Cl. 260—33.8)

This invitation relates to the formation of solvent solutions or cements of synthetic materials such as the polymers and copolymers of butadiene and the like, and particularly to the formation of such cements for the manufacture of chlorinated products analogous to chlorinated natural rubber.

The applicant patentee has found that certain specially prepared soft, stick and "soupy" polymers and copolymers of butadiene and the like yield much more satisfactory chlorinated products than the harder, more rubbery, conventional materials of this general class. The use of such special soft polymers, however, is attended by one considerable difficulty, namely the transfer of the polymer from the latex form to the solvent solution or cement in which it is to be chlorinated. The conventional method for attaining this end would involve simply coagulating the latex, and washing, drying and redissolving the curd in an appropriate solvent. The soft and sticky character of the specially prepared polymers would, unfortunately, render the washing and drying steps impractical on a commercial scale.

Accordingly, it is an object of this invention to provide a novel method for the preparation of cements of polymers and copolymers of butadiene and the like.

Another object is to provide such a method which will enable the production of cements from extremely soft and sticky polymers and copolymers of butadiene and the like.

A further object is to provide such a process which may be carried out with a minimum dislocation of existing methods and equipment involved in the manufacture of synthetic polymers.

A further object is to provide such a process which may be carried out rapidly, and with a minimum expense for labor, equipment and materials.

A still further object is to provide a process which will yield dry cements suitable for chlorination purposes.

SYNOPSIS OF THE INVENTION

The above and other objects are secured, in accordance with this invention, in a process in which a latex of a polymer or copolymer of butadiene or the like is charged into a vessel along with a solvent for the polymer or copolymer, which solvent has a specific gravity different from the latex so that the phases will stratify. The materials are then heated to a temperature at or above the boiling point of the solvent, preferably at a temperature such that the solvent boils very gently. Mechanical agitation may be applied, but will ordinarily be unnecessary, and in general, the net agitation of the solvent and latex phases due to boiling and any mechanical agitation should be only sufficient to effect circulation of the respective phases to and from the interface without extensive disrupton of the interface. A small amount of acid is then introduced into the aqueous phase, and the gentle boiling continued. In the course of approximately one hour, the polymer or copolymer will be continuously and gradually transferred from the latex to the solvent so as to form therein a smooth solvent or cement (substantial portions of the polymer or copolymer will, of course, have been transferred from the latex to the solvent quite early in the process, say within about 10 minutes after the addition of the acid. The cement phase is then separated from the spent latex serum, dried if necessary, and used for any appropriate purpose, for instance, as a starting material for chlorination.

POLYMER AND COPOLYMER LATICES USED

In general, the invention may be employed for the transfer, from the aqueous latices in which they were polymerized, to a suitable solvent, of any polymers or copolymers produced chiefly from polymerizable conjugated doubly unsaturated compounds such as butadiene, isoprene, 2,3 - dimethyl - butadiene - 1,3, piperylene, chloroprene, bromoprene, 2 - acetoxy - butadiene-1,3, and the like. It is to be understood that the polymer or copolymer need not be derived from a single unsaturated compound, but may be derived from a mixture of two or more suitable conjugated unsaturated compounds of the type mentioned above. Likewise suitable are copolymers of one or more of the conjugated unsaturated compounds with minor proportions (up to about 45%, based on the total weight of copolymerized materials) of one or more singly unsaturated compounds copolymerizable therewith, examples of such compounds being vinyl aromatic compounds such as styrene, chlorostyrenes, vinyl naphthalene, etc; acrylic compounds on the order of acrylonitrile, methacrylonitrile, ethyl acrylate, methyl methacrylate, etc.; vinyl compounds such as vinyl chloride, vinyl bromide, vinyl fluoride, vinyle acetate, vinyl ethyl ether, vinyl ethyl sulfide, vinyl methyl ketone, etc.; vinylidene compounds such as vinylidene chloride; and monoolefine such as isobutene, ethylene and the like.

As briefly noted above, the applicant has discovered that certain extremely soft, sticky and "soupy" polymers and copolymers of butadiene and the like yield superior chlorinated products. It would be impractical to coagulate latices of these materials, and to wash, dry and redissolve the coagula to produce cements for chlorination, since the coagula would gum up and entrap large quantities of serum, emulsifying agents, salts, and other undesirable materials in the interior thereof. Moreover, the sticky mass simply could not be washed or dried on a practical scale. Accordingly, the present invention, which avoids the formation of a massive coagulum and the necessity for washing and drying the same, is of particular application to the formation of cements from said specially prepared polymers and copolymers.

Referring to the specially prepared soft and sticky polymers and copolymers, these are formed by polymerization or copolymerization of the conjugated unsaturated compounds in emulsion and in the presence of excessive quantities of "modifying agents," i. e., agents which direct the polymerization toward the formation of softer and more plastic materials, the pioneer patent in this field being that to Wollthan 2,281,613. An example of the use of "modifying agents" in the preparation of polymers destined for chlorination is given in Blomer et al. 2,222,345, although evidently this patent does not contemplate the extreme degree of "modification" which the applicant has found to be most suitable. The applicant's invention is of particular advantage in the processing of polymers and copolymers which have been subjected to an extraordinary degree of "modification" during polymerization, such as to reduce the intrinsic viscosity of the polymer or copolymer to 0.4 or below. As set forth in the preceding paragraph, these materials would be practically impossible to coagulate, wash, dry and redissolve by ordinary means. Polymers and copolymers of indefinitely low intrinsic viscosity may be processed in accordance with this invention, even below values at which intrinsic viscosity ceases to have any great significance, e. g., below 0.1.

While it is understood that the process of this invention is of particular application to latices of soft polymers and copolymers and still more particularly to soft polymers destined for chlorination, the process may also be applied to latices of harder and more rubbery polymers and copolymers of conventional types. Such a method of processing will often be desirable, for instance where it is desired to transfer a polymer from latex to solvent cement without going through the coagulation and drying stages. The latter stage is quite often undesirable; for instance, films cast from solutions of vinyl chloride resins and butadiene-acrylonitrile elastic copolymers will contain gel particles if the elastic copolymer is subjected to heat-drying. The process of this invention affords a means for transferring the butadiene-acrylontrile elastomer directly from latex to solvent solution.

THE SOLVENT

In general, the solvents employed in this invention must (1) Differ in specific gravity from the latex, so as to constitute a separate phase
(2) Be capable of dissolving the polymer or copolymer
(3) Have a boiling point lower than 100° C.
(4) Be at most sparingly miscible with water, and
(5) In those cases where the cement is to be used directly in the manufacturing of chlorinated polymers and copolymers, be resistant to attack by chlorine.

Solvents presenting themselves under the foregoing criteria are the halogenated aliphatic solvents, such as carbon tetrachloride, chloroform, methylene dichloride, dichlorofluoromethane, ethylene dichloride, trichloroethylene, trichloroethane and the like. Other suitable solvents include the nitroparaffins such as nitromethane, nitroethane and the like; carbon disulfide and the like; and mixtures containing two or more of the solvents above indicated as being suitable. All of the previously listed solvents are denser than most latices, hence would form a lower stratum in the practice of this invention. Suitable solvents which are lighter than the latex and which would therefore form an upper stratum include the aliphatic solvents on the order of petroleum ether, hexane, kerosene and the like; aromatic and hydroaromatic solvents such as benzene, toluene, xylene, tetralin, etc.; diethyl and other ethers; terpene solvents such as turpentine; and the various ester solvents. The sole limitation is that any solvent or mixture thereof shall meet the criteria (1)—(5) above.

THE TRANSFER OPERATION

The operation of contacting the latex and solvent may be carried out in any suitable apparatus, preferably a closed kettle having a steam jacket or other heating means about the lower portion thereof and a reflux condenser or other means for recovering any solvent which may be evaporated from the mass. The vessel may be provided with gentle agitating means such as a concentric anchor-type rotary stirrer, but this is unnecessary and undesirable in most cases.

With regard to the proportion of solvent to latex entering the process of this invention, a sufficient amount of solvent should be used so that the transfer of all the polymer or copolymer to the solvent will yield a cement of the desired degree of dilution. For example, if the cement is to be used for chlorination purposes, a convenient concentration of polymer in the cement would be about 10%. Commonly, the latex will contain about 25% of polymer. The desired ratio of solvent to latex would be inverse to the ratio of these percentages of 2.5:1. In practice, this ratio may vary from 50:1 to 1:1. It is understood that the figures 10% and 25% above are illustrative merely: for instance, cements of concentrations even higher, on the order of 30%–50%, may be prepared for chlorination or other purposes. Likewise much more concentrated latices have been prepared and may be used, e. g., 50% or higher.

In operation, the solvent and latex, are charged into the reaction vessel, and heat applied to bring the solvent approximately to the boiling point, i. e., between the boiling point and about 50 C. therebelow. It is not necessary that the solvent shall actually boil, and vigorous boiling is to be avoided after the addition of acid; a bare incipient simmering or boiling is preferred. There is then added a small amount of an at least moderately strong acid, such as hydrochloric acid, sulfuric acid, phosphoric acid, acetic acid or the like, or an acid salt such as acid sodium sulfate, sufficient to cause transfer of the polymer or copolymer from the latex to the solvent within a reasonable time. The exact quantity will vary from one polymer to another, and from one acid to another, and is best determined for each case by preliminary small scale experiment. In most cases, an amount of acid molecularly equivalent to from about 10 to about 40 cc. of concentrated hydrochloric acid per liter of latex will be sufficient. Upon the addition of the acid, the polymer or copolymer will transfer smoothly from the latex to the solvent, progress in this direction being very substantial in as short a time as ten minutes and being virtually complete in one hour. The solvent cement layer is then separated from the spent latex serum by decantation, and forwarded to such further processing and use as may be desired. As mentioned above, the cements produced in accordance with the foregoing process from special soft sticky polymers and copolymers are of special advantage for the production of chlorinated products.

With the foregoing general discussion in mind, there are given herewith a detailed example of the practice of this invention. All parts given are by weight.

EXAMPLE 1

*Preparation of polymer latex*

|  | Parts |
|---|---|
| Butadiene | 180 |
| Water | 180 |
| Sodium stearate | 2.5 |
| Tertiary 12-carbon mercaptan ("Sulfole B-8," manufactured by the Sharples Chemicals, Inc.) | 4.5 |
| Potassium persulfate | 0.3 |

It will be noted that the modifier (mercaptan) in the above recipe far exceeds commercial practice.

All of the ingredients except the butadiene were dissolved together and charged into a closed reactor provided with a rotary stirrer. The reactor was then closed, the temperature adjusted to 35° C. and the butadiene bled in under pressure. Agitation was continued for 15 hours at 35° C., at the end of which time a small amount of p-phenylene diamine was added to arrest polymerization and the unreacted butadiene was blown off. The resultant latex, containing 25% solids, was used in the process of this invention as will hereinafter be described.

The coagulum from the above latex was gummy, soft, and sticky, and contained entrapped therein large quantities of water, salts and other impurities derived from the latex serum. The polymer was completely unsuitable for ordinary processes of purification and drying. The intrinsic viscosity thereof was 0.25.

*Preparation of cement*

|  | Parts |
|---|---|
| Latex prepared as above described | 100 |
| Carbon tetrachloride | 250 |
| Hydrochloric acid (conc.) | 6 |

A closed reactor provided with a heating jacket at the bottom and with a reflux condenser at the top was provided for this manipulation.

The carbon tetrachloride was charged into the reactor, and the latex then added. Heat was supplied to the vessel jacket until the solvent reached a barely incipient boil, which condition was maintained throughout the further processing up to the point where its discontinuance is indicated. The hydrochloric acid was then introduced through the reflux condenser. At the end of one hour, all of the polymer had become transferred to the carbon tetrachloride-ethylene dichloride layer, forming a cement therein. At this point, the incipient boiling was discontinued, and the reactor charge cooled to room temperature. The cement layer was readily and completely separated from the spent latex serum by decantation. The cement layer was dried by refluxing through a total condenser, return reflux being passed through a calcium chloride cartridge before re-entering the body of the cement. The resultant cement was admirably suited for a variety of applications, and particularly as a starting material for chemical alterations such as chlorination, cyclization, hydrochlorination and the like.

EXAMPLE II

| Latex (prepared as described in Example I under "Preparation of polymer latex") | liters | 40 |
|---|---|---|
| Carbon tetrachloride | do | 64 |
| Ethylene dichloride | do | 16 |
| Hydrochloric acid | cc | 600 |

A thirty gallon jacketed kettle having a concentric anchor-type stirrer and an overhead reflux condenser was provided for the process. The latex, carbon tetrachloride and ethylene dichloride were charged into the kettle, and steam introduced into the jacket to bring the solvents to a vigorous boil. The steam was then shut off, and briefly reintroduced from time to time during the subsequent processing up to the point where its discontinuance is indicated below, to keep the temperature of the mass in the range from 1° to 3° C. below the boiling point of the mixture.

The acid was then introduced into the mass, which was gently stirred to a degree insufficient to break the interface between the phases. At the end of an hour, the intermittent injection of steam into the jacket was discontinued, and the mass cooled to room temperature. The carbon tetrachloride-ethylene dichloride layer had taken up substantially all of the polymer from the latex. The resultant polymer-solvent cement was smoothly and completely separated from the spent serum by simple decantation.

The above processes were also applied to other latices and solvents as follows:

*Latices*

Commercial butadiene-styrene copolymer latex
Neoprene latex
Polybutadiene latex prepared with conventional amounts of modifiers
Commercial butadiene-acrylonitrile latex
A polyisoprene latex

*Solvents*

Mixture of equal parts of carbon tetrachloride and ethylene dichloride
Unmixed ethylene dichloride
Methylene dichloride
Trichloroethylene
Carbon disulfide
Benzene
Solvent naphtha Satisfactory results were obtained in each case.

From the foregoing general description and detailed specific examples, it will be seen that this invention provides a novel and convenient method for the manufacture of solvent cements of butadiene and like polymers and copolymers. Although the process may be used for the production of cements of conventional polymeric materials, it is of special and unique application to the production of cements from specially prepared soft, gummy, sticky and "soupy" polymers and copolymers, cements of which cannot be prepared on a practical scale by any other method heretofore practiced. Cements of the specially prepared polymers are particularly useful for the production of chlorinated and other chemically converted products.

What is claimed is:

1. Process which comprises floating a body of a latex upon a body of carbon tetrachloride, the net agitation of the solvent and latex phases being only sufficient to effect circulation of the respective phases to and from the interface without any extensive disruption of said interface, heating the carbon tetrachloride to approximately its boiling point, acidifying the latex to effect transfer of the dispersed phase thereof to the carbon tetrachloride, said latex having been prepared in the presence of excessive amounts of modifying agents so that dispersed phase has an intrinsic viscosity of from 0.1 to 0.4, and said dispersed phase being selected from the group consisting of polymers of conjugated di-ethylenically-unsaturated compounds and copolymers thereof with each other and with minor proportions of mono-ethylenically-unsaturated compounds copolymerizable therewith and having an intrinsic viscosity of from 0.1 to 0.4, and separating the resultant carbon tetrachloride solution from the spent latex serum.

2. Process which comprises floating a body of an excessively modified latex of a butadiene polymer having an intrinsic viscosity of from 0.1 to 0.4 upon a body of carbon tetrachloride, the net agitation of the solvent and latex phases being only sufficient to effect circulation of the respective phases to and from the interface without any extensive disruption of said interface, heating the carbon tetrachloride to incipient boiling, acidifying the latex to effect transfer of the polymer to the carbon tetrachloride, and separating the resultant carbon tetrachloride solution from the spent latex serum.

3. Process which comprises floating a body of an excessively modified latex of a butadiene polymer having an intrinsic viscosity of from 0.1 to 0.4 upon a body of carbon tetrachloride, the net agitation of the solvent and latex phases being only sufficient to effect circulation of the respective phases to and from the interface without any extensive disruption of said interface, heating the carbon tetrachloride to incipient boiling, acidifying the latex to effect transfer of the polymer to the carbon tetrachloride, separating the resultant carbon tetrachloride solution from the spent latex serum, and chlorinating the resultant carbon tetrachloride solution of polymer.

SAYRE RODMAN.

REFERENCES CITED

The following references are of record in the file of this patent:

UNITED STATES PATENTS

| Number | Name | Date |
|---|---|---|
| 1,936,106 | Crockett | Nov. 21, 1933 |
| 2,301,926 | Blomer | Nov. 17, 1942 |
| 2,391,227 | Clifford | Dec. 18, 1945 |

OTHER REFERENCES

Morton, "Lab-Technique in Organic Chem.," pages 206–7, McGraw-Hill (1938).

Certificate of Correction

Patent No. 2,495,135                                                                 January 17, 1950

SAYRE RODMAN

It is hereby certified that errors appear in the printed specification of the above numbered patent requiring correction as follows:

Column 1, line 9, for "stick" read *sticky*; column 2, line 19, after the word and period "acid." insert a closing parenthesis; column 4, line 4, for "manufacturing" read *manufacture*; line 66, for "50 C." read *5° C.*; column 5, line 30, for "180" read *100*; and that the said Letters Patent should be read with these corrections therein that the same may conform to the record of the case in the Patent Office.

Signed and sealed this 25th day of July, A. D. 1950.

[SEAL]

THOMAS F. MURPHY,
*Assistant Commissioner of Patents.*